March 8, 1966  J. M. BARR  3,238,663
TETHERED TOY AIRPLANE WITH PILOT EJECTION MEANS
Filed June 18, 1963  3 Sheets-Sheet 1
FIG. 1.
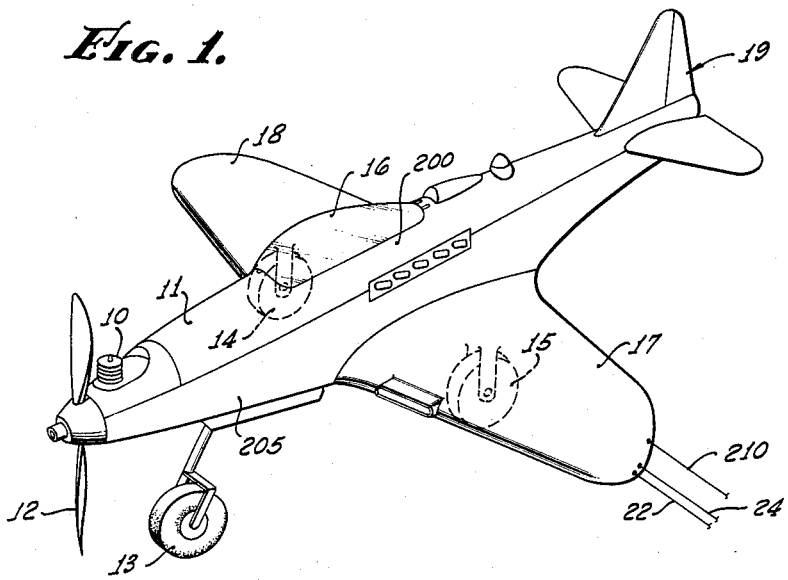
FIG. 2.
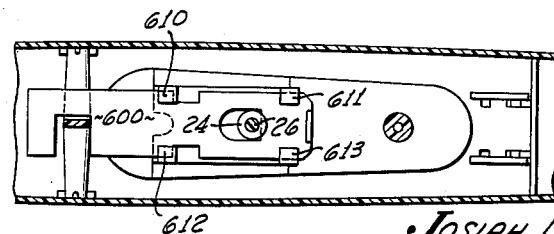
FIG. 3.
INVENTOR.
JOSIAH MORRISON BARR
BY
Nicholas T Vohr
ATTORNEY.

March 8, 1966  J. M. BARR  3,238,663
TETHERED TOY AIRPLANE WITH PILOT EJECTION MEANS
Filed June 18, 1963  3 Sheets-Sheet 2

INVENTOR.
JOSIAH MORRISON BARR
BY
Nicholas T Volk
ATTORNEY.

March 8, 1966   J. M. BARR   3,238,663
TETHERED TOY AIRPLANE WITH PILOT EJECTION MEANS
Filed June 18, 1963   3 Sheets-Sheet 3

INVENTOR.
JOSIAH MORRISON BARR
BY
ATTORNEY.

United States Patent Office 3,238,663
Patented Mar. 8, 1966

3,238,663
TETHERED TOY AIRPLANE WITH PILOT EJECTION MEANS
Josiah Morrison Barr, Manhattan Beach, Calif., assignor, by mesne assignments, to American Machine & Foundry Company, New York, N.Y., a corporation of New Jersey
Filed June 18, 1963, Ser. No. 288,671
3 Claims. (Cl. 46—77)

This invention relates to a toy aircraft equipped with a prime mover and more particularly to the aircraft of the above type which includes a pilot, an ejection seat for the pilot and a parachute attached to the pilot.

It is an object of this invention to provide a self-propelled toy aircraft with a canopy, a pilot and an ejection seat constituting an integral part of the pilot, a parachute attached to the pilot and a mechanism for releasing the canopy and the seat while the aircraft is in flight.

Still another object of this invention is to provide a self-propelled toy aircraft with a pilot compartment, a canopy over the pilot compartment, a pilot and a parachute mounted within the compartment and means for releasing and ejecting first the canopy and then, at a later controllable time, the pilot, or, in an alternative form, releasing the pilot and the canopy almost simultaneously and with the pilot striking the canopy for pushing the canopy out of the way.

Referring to the drawings,

FIGURE 1 is a perspective view of the aircraft;

FIGURE 2 is a vertical longitudinal section of the cockpit portion of the aircraft;

FIGURE 3 is a horizontal, upward view, taken in plane 3—3 and in the direction of arrows 3—3 of that portion of the cockpit floor which also includes a portion of an ejection seat release mechanism in which the initial cycle of the canopy ejection is accomplished by the pilot striking the canopy;

Figure 4:
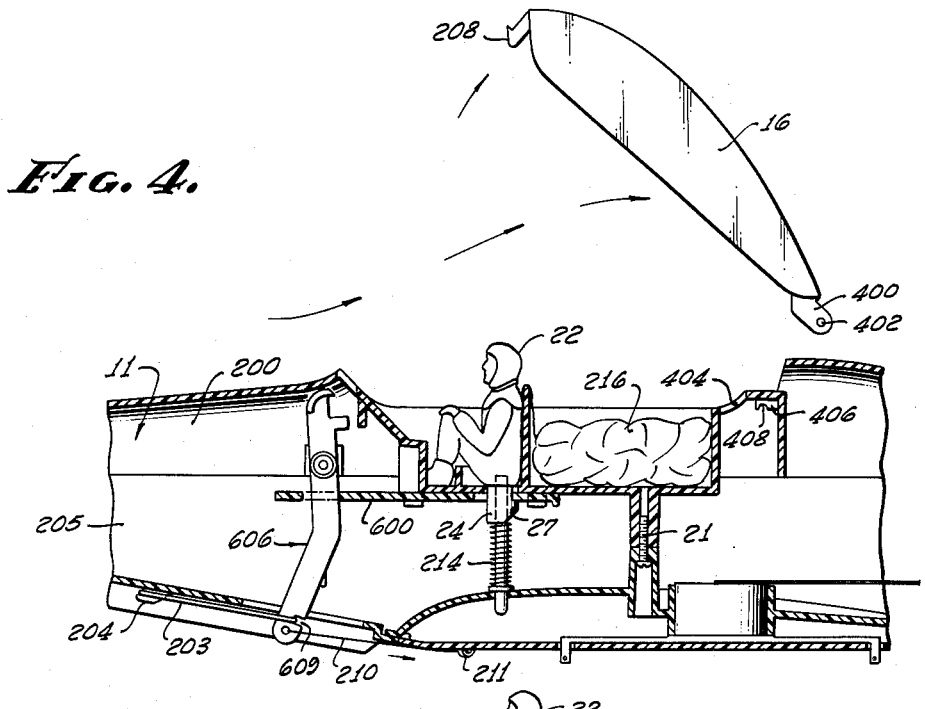
FIGURES 4 and 5 are two vertical sectional views of the cockpit with FIG. 4 illustrating a released canipy and FIG. 5 illustrating a released pilot and ejection seat.
Figure 5:
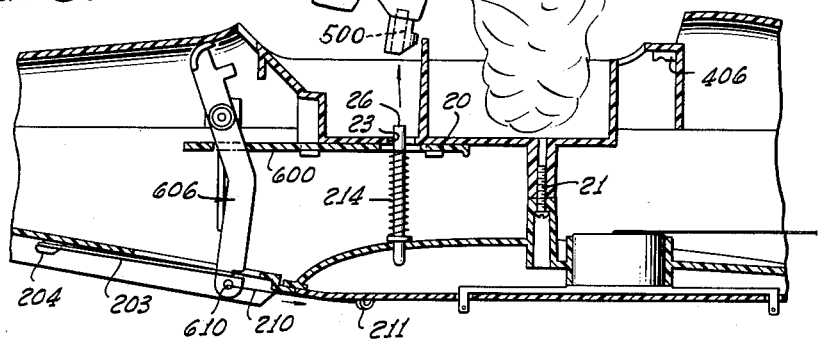
Figure 6:
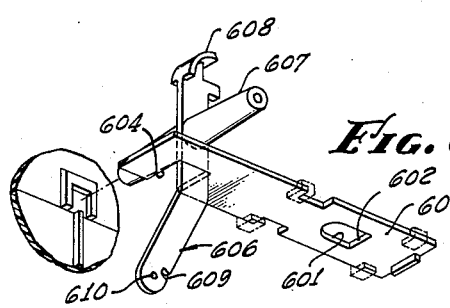
FIGURE 6 is a perspective view of the release mechanism.

Referring to the drawings, the aircraft includes a piston engine 10 mounted in the nose portion of a fuselage 11, a propeller 12, tricycle landing gear 13, 14 and 15, a releasable canopy 16, wings 17 and 18 and a tail assembly 19. The flight of the aircraft is controlled by means of two strings 22 and 24 and the release mechanism for releasing the canopy and ejecting the pilot is controlled by means of a third string 210 which will be described more in detail later. The cockpit portion of the aircraft includes a floor and side wall member 20 attached to the fuselage with a set-screw 21. A pilot-seat member 22–24 is mounted on floor 20 with the aid of a slot 23 in floor 20 and, as it will be called here, a releasable ejection seat 24 which is an integral part of the pilot-seat 22–24, comprises a hollow cylindrical boss with a cylindrical socket 500, see FIG. 5, provided in seat 24. Socket 500 receives a centering and mounting rod 26 which is used for convenient and ready mounting and centering of the pilot-seat member 22–24 in the compartment and also for mounting an ejection spring 214 over the rod. Rod 26 also acts as a guide and support means for spring 214. The seat member 24 is provided with a catch 27 which engages a slidable latch 600 provided with an opening 601 and a straight edge 602 which is used for engaging the straight edge and tooth of catch 27. Latch 600 also includes a slot 604 which is used for passing a latch operating lever arm 606 which includes a shaft 607, a second, canopy latch 608 at the upper end of the arm, a slot 609 and a hole 610 at the lower end of the arm. The floor member 20 is provided with four brackets 610–613 for guiding and supporting in a sliding engagement the latch plate 600. The fuselage 11 of the plane, and especially its upper shell 200, is provided with two rectangular openings 201 which are used for placing shaft 601 in rotatable relationship with respect to the fuselage. A rubber band 203 is stretched between arm 606 and a hook 204 provided on the lower shell 205 of the fuselage. The rubber band keeps arm 606 tensioned in the direction of force exerted by the band which keeps latch 608 in engagement with the canopy 16. Canopy 16 is provided with a hook 208 for engaging latch 608 in the manner illustrated in FIG. 2. An appropriate opening is provided in the panel portion of the floor panel member 20 for letting hook 208 pass through the panel and engage latch 608. A string 210 is attached to the lower end of arm 606 with the string being threaded through hole 610, an eyelet 211 and through the tip of wing 17, as shown in FIG. 1. Canopy 16 is mounted over the pilot and parachute compartments 220 and 222 by means of a hinge arm 400 constituting an integral part of canopy 16 and two pins 402 projecting from the hinge arm 400. The upper shell 200 of the fuselage is provided with an opening 404 for inserting arm 400 into the fuselage and aligning the two pins 402 with two brackets 406 spaced from each other which are provided with semi-circular seats 408 for receiving the pins 402 in the manner shown in FIG. 2. The canopy 16, the canopy seat provided on the upper shell 200 of the fuselage, catch 208 and, as it will be called here, an opening hinge including elements 400, 402, 406, 408, 404 and the fuselage members 410 and 412, are all proportioned so as to keep canopy 16 under a slight tension, like a cantilever spring, when it is in the locked position. When latch 608 is released, the spring action rotates canopy 16 around the open hinge, with the result that the front end of the canopy becomes raised above the fuselage shell 200, and thereafter the impinging stream of air lifts canopy 16 away from the fuselage in the manner illustrated in FIG. 4. When the operator pulls on string 210, the lever arm 606 is turned counterclockwise, as viewed in FIG. 2, around shaft 607, whereupon latch 608 releases canopy 16 and because of the spring action and air pressure, the canopy leaves the aircraft in the manner illustrated in FIG. 4. If arm 606 is turned still further, latch 600 will be pushed backward by arm 607 which releases latch 600 and its edge 602 from engagement with catch 27. A compression spring 214 is then free to eject the seat 24 and pilot 22 in the manner illustrated in FIG. 5. A parachute 216, stored in the rear compartment 222, follows the pilot and later becomes open due to air pressure, and the pilot with its seat then float to the ground.

The latches and the catches are so arranged and dimensioned that canopy 16 is released first and the pilot-seat member is ejected thereafter only if string 210 is pulled still further. Therefore, canopy 16 can be released at one instant and pilot-seat member at any later instant. If string 210 is pulled all the way quickly, the canopy and the pilot-seat member are released practically simultaneously, but, even then, canopy 16 will leave the plane first so that at no time will it block the ejection of the pilot.

In the alternative form of the invention, the canopy, the open hinge elements, the adjacent fuselage canopy seat, and the catch-latch elements are dimensioned so that the canopy merely rests on top of the fuselage seat after the latch has been released. The stream of air going by the aircraft and the stream of air created by the propeller, known as the "prop wash," lift the front end of the canopy and rotate it around its open hinge whereupon the air stream accelerates this lift and the canopy very swiftly leaves the plane. The original lift of the canopy is due to the fact that its upper surface very closely approximates the shape of an airfoil which creates the well-known lift typical of all airfoils.

Figure 7:
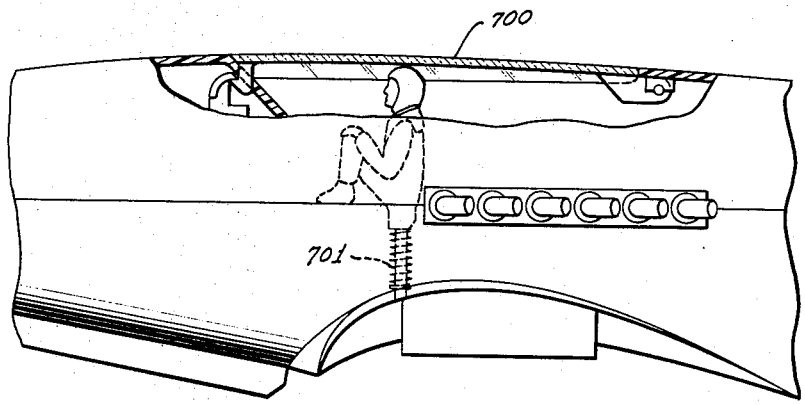
FIGURES 7 and 8 are two alternative structures of an aircraft in FIG. 7 and of a canopy release mechanism in FIG. 8.

FIGURE 7 illustrates an alternative form of the fuselage, canopy and canopy ejection system. In FIG. 7 canopy 700 is flush with the fuselage and, therefore, no lift is furnished by the airfoil effect as is the case in FIGS. 1–5. In this arrangement spring 701 is made stronger and the initial lift is obtained by the pilot striking the canopy. This lifts the canopy and then the air stream swiftly lifts it still further and out of the way of the pilot who then is also free to leave the plane.

Figure 8:
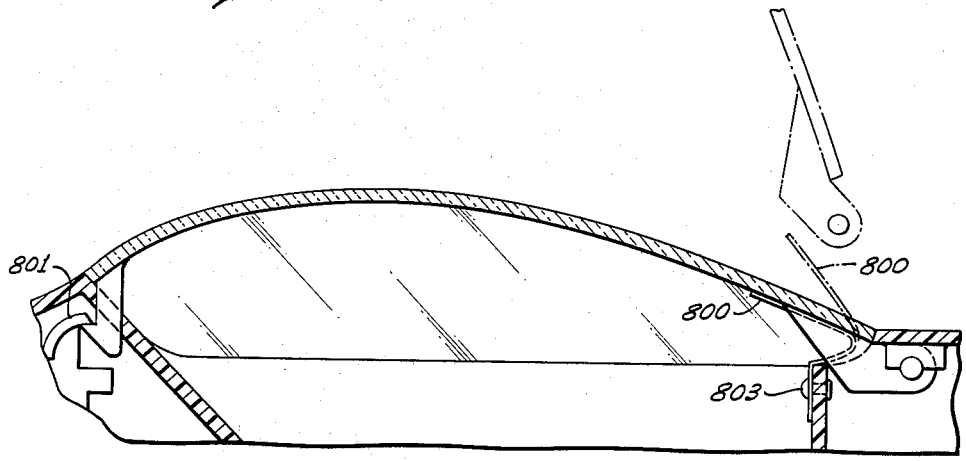

In this alternative form it, of course, is also possible to provide the springing action either by the nature of the configuration of the canopy or by providing a spring 800, FIG. 8, which rotates the canopy out of the way the very moment latch 801 is released. Spring 800 is either a bent or flat leaf spring which is fastened to the plane by means of a snap 803 or any other known means.

What I claim is:

1. In a model airplane powered by an internal combustion engine and manually guided in a circular flight path by control lines, a pilot ejection system comprising: a cockpit opening in said fuselage, a canopy normally held in closed position over said cockpit, means for opening said canopy, a pilot member in said cockpit, a spring arranged in said cockpit to eject said pilot member forceably from said cockpit, latch means restraining said spring in a cocked stressed condition, means for releasing said latch means, and a control line paralleling the first-mentioned control lines and being connected to said canopy opening means and latch-releasing means, whereby the pulling of said extra control line is effective to cause opening of said canopy and ejection of said pilot member, the connection of said latch releasing means to said spring including lost-motion means whereby a greater pull on said string is required to eject said pilot member than is required to open said canopy.

2. The invention according to claim 1, wherein said canopy is hingedly connected to the airplane fuselage at one end, and said canopy opening means comprises a latch normally securing the other end of said canopy and being operable to release the same.

3. The invention according to claim 2, wherein said other end of the canopy is forward and said hinged connection thereof is rearward, whereby the airstream in flight effects opening of the canopy.

References Cited by the Examiner

UNITED STATES PATENTS

| | | |
|---|---|---|
| 2,451,593 | 10/1948 | Washington. |
| 2,543,965 | 3/1951 | Hamilton _____ 46—77 |
| 2,580,405 | 1/1952 | Byers _____ 46—77 |
| 2,878,615 | 3/1959 | Burgin _____ 46—86 |

FOREIGN PATENTS

| | | |
|---|---|---|
| 1,071,879 | 3/1954 | France. |

RICHARD C. PINKHAM, *Primary Examiner.*